June 14, 1966   J. B. OTTESTAD   3,255,678
PISTON ASSEMBLIES
Filed April 3, 1964
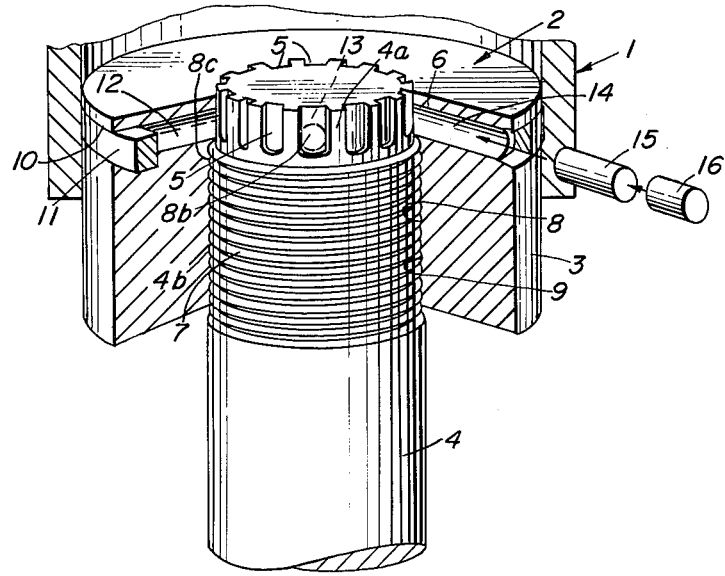
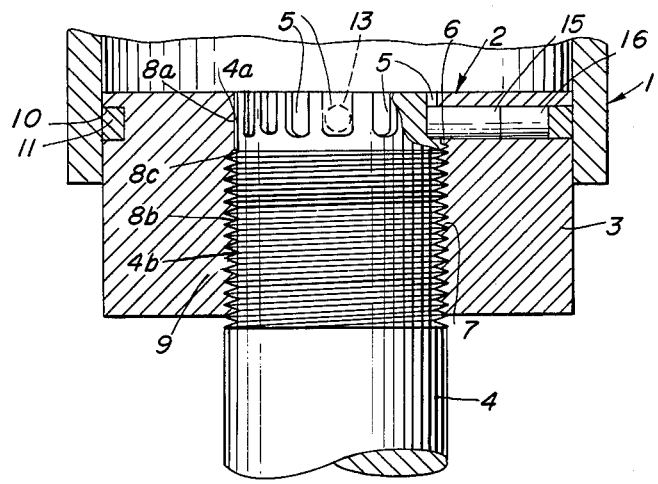
INVENTOR.
JACK B. OTTESTAD

United States Patent Office 3,255,678
Patented June 14, 1966

3,255,678
PISTON ASSEMBLIES
Jack B. Ottestad, La Jolla, Calif., assignor to U.S. Industries, Inc., New York, N.Y., a corporation of Delaware
Filed Apr. 3, 1964, Ser. No. 357,037
7 Claims. (Cl. 92—211)

This invention relates to pistons, and, more particularly, to pistons which are particularly well adapted for use in high-energy rate impact machines, and the like.

It is a primary object of the present invention to afford a novel piston wherein the parts thereof are constituted and arranged in a novel and expeditious manner.

Certain types of machines embodying pistons, such as, for example, high-energy rate impact machines, and the like, embody piston structures which are subjected to severe shock loads. In such machines it is highly important that the components of such piston structures be secured together in such a manner that the pistons will effectively withstand high stresses. In addition, in such pistons it is highly important that the components thereof be secured together in such a manner as to insure that the connection therebetween will not be loosened by vibrations, and the like. It is an important object of the present invention to enable such securing together of piston structure components to be accomplished in a novel and expeditious manner.

In machines of the aforementioned type, the piston structures thereof commonly embody a piston head secured to one end of a substantially rigid post or connecting rod. It is another object of the present invention to enable such a piston head to be secured to such a post or connecting rod in a novel and expeditious manner.

Yet another object of the present invention is to afford a novel piston of the aforementioned type wherein the parts thereof are so constituted and arranged that although, in the assembled piston, the head is firmly secured to the post, and the connection therebetween is effectively locked against being loosened by vibrations, the piston may be quickly and easily assembled and disassembled.

A further object is to afford a novel piston of the aforementioned type wherein the head thereof may be so secured and locked to the post thereof in a plurality of positions.

Another object is to enable the piston head of a piston to be locked in position on the post of such a piston by means of a pin in a novel and expeditious manner.

Another object is to afford a novel piston of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary, partially exploded sectional view of a driver assembly embodying the principles of the present invention; and FIG. 2 is a fragmentary sectional view of the driver assembly shown in FIG. 1 with the parts thereof disposed in assembled relation relative to each other.

In the drawings, a portion of a driver assembly including a cylinder 1 and a piston 2 is shown to illustrate the preferred embodiment of the present invention. The piston 2 includes, in general, a piston head 3 mounted on one end of an elongated post or connecting rod 4.

The driver assembly shown in the drawings is of a type well adapted for use in a high-energy rate impact machine, or the like, wherein the lower end of the post 4 may be rigidly connected to a die or other suitable member, not shown, which is to be driven in a straight line movement by the piston 2. However, as will be appreciated by those skilled in the art, this merely by way of illustration and not by way of limitation, and the present invention is not limited to pistons only intended for such use.

The post 4 has a plurality of substantially parallel, elongated recesses 5 formed in the outer periphery of the upper end portion 4a thereof. The recesses 5 are disposed in spaced relation to each other around the periphery of the post 4, and open upwardly through the upper end thereof.

The upper end portion 4a of the post 4 is smaller in diameter than the immediately underlying portion of the post 4, to thereby afford an outwardly projecting, upwardly facing, annular shoulder 6 at the lower end of the end portion 4a. External threads 7 are formed on the outer periphery of the post 4, the threads 7 extending downwardly from the shoulder 6.

The piston head 3 is substantially annular is horizontal, transverse cross-section, having an opening 8 extending vertically through the radial center thereof. The opening 8 has an upper end portion 8a, which is complementary in size and shape to the end portion 4a of the post 4, and an internally threaded lower end portion 8b, which is somewhat larger in diameter than the end portion 8a. The junction of the end portions 8a and 8b affords an inwardly projecting downwardly facing shoulder 8c in the opening 8a for engagement with the shoulder 6 on the post 4, as will be discussed in greater detail presently.

The threads 9 in the lower end portion 8b of the opening 8 extend downwardly from the shoulder 8c to the lower end of the piston head 3, and are operatively engageable with the threads 7 on the post 4. The threads 7 on the post 4 preferably extend downwardly from the shoulder 6 a sufficient distance to insure that when the piston head 3 is disposed in operative position on the post 4, with the threads 9 operatively engaged with the threads 7, and with the shoulder 8c disposed in abutting engagement with the shoulder 6, the threads 9 are operatively engaged with the threads 7 throughout the distance from the shoulder 8c to the bottom of the piston head 3. With this construction, when the piston head 3 is so disposed on the post 4, the upper ends of the post 4 and the piston head 3 are disposed in uniplanar relation to each other, and the piston head 3 is releasably secured to the post 4 in such a manner as to enable the piston 2 to withstand severe shocks and stresses, the interconnected threads 7 and 9 and the engaging shoulders 6 and 8c affording an effective interconnection between the head 3 and the post 4 capable of withstanding such shocks and stresses.

The piston head 3 has an annular groove 10 formed in, and extending around the outer periphery of the upper end portion thereof, and a split bearing or piston ring 11 is mounted in the groove 10. The piston ring 11 is preferably of such cross-sectional size that it fits in the groove 10 with a snug, but freely slidable fit. Three substantially equally spaced openings 12, 13, and 14 extend radially outwardly through the piston head 3 from the opening 8 to the groove 10. The openings 12–14 are disposed in radial alignment with the groove 10 and are preferably of the same transverse width as the groove 10.

The recesses 5 are so disposed on the post 4, and the openings 12–14 are so disposed in the piston head 3 that when the piston head 3 is mounted in operative position on the post 4, at least one of the openings 12–14 is disposed in radial alignment with a respective one of the recesses 5. A steel pin 15 is mounted in the aforementioned one opening, such as, for example the opening 14, which is disposed in radial alignment with the aforementioned respective one of the recesses 5, FIG. 2. The pin 15 is preferably substantially complementary in transverse size and shape to the openings 12–14, and is preferably substantially the same width as each of the recesses 5, so that when the pin 15 is disposed in the opening 12, 13, or 14 and the adjacent, radially aligned recess 5, it fits in both the last-mentioned recess 5 and the aligned one of the openings 12–14 with a snug, but freely slidable fit.

It will be remembered that, preferably, when the piston head 3 is disposed in operative position on the post 4, the shoulders 6 and 8c are disposed in abutting relation to each other. It is a part of the concept of the present invention to insure that one of the openings 12–14 is aligned with one of the recesses 5, whenever the piston head 3 is disposed in the aforementioned operative position on the post 4. In this connection, it will be noted that the piston 1 is shown in the drawings as embodying fourteen recesses 5 and three openings 12–14. With such construction, if, when the shoulders 6 and 8c first move into abutting engagement with each other, the recesses 5 and the openings 12–14 are misaligned to their greatest extent, it would only require a rotation of the piston head 3 through approximately eight degrees to align one of the openings 12–14 with one of the recesses 5. If the pitch of the threads 7 is one-eighth of an inch such an eight degree rotation of the piston head 3 would cause only approximately .0026 of an inch translation of the piston head 3 longitudinally of the post 4. Under such conditions, such an aligning rotation of the piston head 3 may normally be made in a direction effective to bring the shoulders 6 and 8c into firmer engagement with each other after the shoulders 6 and 8c are first abuttingly engaged.

Although the piston 1 is shown in the drawings as embodying fourteen recesses 5 and three recesses 12–14, it will be appreciated by those skilled in the art that this is merely by way of illustration and not by way of limitation, and that various numbers of recesses 5 and openings 12–14 may be afforded by those skilled in the art without departing from the purview of the present invention. However, preferably, the post 4 has an even number of equally spaced recesses 5 and the piston head 3 has an odd number of equally spaced openings 12–14, or vice versa, so as to insure a minimum amount of rotation to effect proper alignment, with a minimum weakening of the post 4 and the piston head 3. For example, if the pitch of the threads 7 was one-eighth of an inch, six recesses 5 and three openings 12–14 would require a maximum rotation of slightly less than twenty degrees for proper alignment with a piston head translation of approximately .006 of an inch; twelve recesses 5 and three openings 12–14 would require a maximum rotation of slightly less than ten degrees for proper alignment, with a piston head translation of approximately .003 of an inch; and twelve recesses 5 and nine openings 12–14 would require a maximum rotation of slightly less than three degrees for proper alignment, with a piston head translation of approximately .001 of an inch.

In the driver assembly shown in the drawings, wherein the opening 14 is the opening aligned with a recess 5, a plug 16, made of a suitable flexible material such as, for example, nylon is mounted in the opening 14 outwardly of the steel pin 15. The plug is complementary in transverse size and shape to the opening 14, and is of such length that when the pin 15 is disposed in the opening 14 in fully seated relation to the inwardly disposed recess 5, and the plug 16 is disposed in operative position outwardly of the pin 15, the piston ring 11 is operatively engaged with the outer end of the plug 16 in position to yieldingly hold the pin 15 in its aforementioned fully seated position. In such position the pin 15 is operable to effectively lock the head 3 and the post 4 against rotation relative to each other.

The piston 2 is of such transverse cross-sectional size and shape that when it is mounted in operative position in the cylinder 1, it fits in the cylinder 1 with a snug, but freely slidable fit, with the outer periphery of the piston ring 11 disposed in abutting engagement with the inner surface of the cylinder 1 to thereby positively hold the piston ring 11 in firm abutting engagement with the outer end of the plug 16.

With this construction, the head 3 and the post 4 of the assembled piston 2 are effectively secured together in operative position, and are effectively locked in such position at all times.

In addition, with a piston constructed in the manner of the piston 2 shown herein, it may be quickly and easily assembled and disassembled. For example, in the assembly of the piston 2, the cylinder head 3 merely needs to be screwed down onto the threads 7 on the post 4 into position wherein the shoulders 8c and 6 are disposed in abutting engagement with each other, and then tightened into position wherein one of the openings 12–14 is disposed in radial alignment with an immediately inwardly disposed recess 5. Thereafter, the pin 15 may be placed in the aforementioned one of the openings 12–14; the plug 16 may then be placed in the same opening; and the piston ring 11 may be mounted in operative position in the groove 10. That completes the assembly of the piston 2. Disassembly may be quickly and easily accomplished by merely reversing the aforementioned steps, that is, first removing the piston ring 11; then removing the plug 16 and the pin 15; and then unscrewing the piston head 3 from the post 4.

From the foregoing it will be seen that the present invention affords a novel piston assembly wherein the parts thereof are firmly secured and locked together in assembled relation to each other.

Also, it will be seen that the present invention affords a novel piston of the aforementioned type, which may be quickly and easily assembled and disassembled.

In addition, it will be seen that the present invention affords a novel piston which is practical and efficient in operation, and which may be readily and economically produced commercially.

Thus, while I have illustrated and described the preferred embodiment of my invention it is to be understood that this is capable of variation and modification, and I therefore do not wish to be limited to the precise details set forth, but desire to avail myself of such changes and alterations as fall within the purview of the following claims.

I claim:
1. A piston comprising
 (a) an elongated member having threads on one end portion thereof,
 (b) said member having a recess in said one end portion,
 (c) a piston head having threads operatively engaged with said first-mentioned threads in position to secure said head to said elongated member,
 (d) said head having an opening therein,
 (e) a pin slidably mounted in said recess and said opening in position to hold said head from turning on said elongated member,
 (f) means yieldingly holding said pin in said position in said recess and in said opening, and

(g) said means for yieldingly holding said pin including a split bushing mounted in said piston head in overlying relation to said opening.

2. A piston comprising
(a) an elongated post having threads
   (1) on one end portion thereof
   (2) in spaced relation to the adjacent end of said post,
(b) said post having a recess in the outer peripheral surface of said end portion,
(c) said recess
   (1) being disposed between said threads and said end and
   (2) opening outwardly through said end,
(d) a piston head,
(e) said piston head having
   (1) threads operatively engaged with said first-mentioned threads in position to releasably secure said post and said head together, and
   (2) an opening therein,
(f) a pin removably mounted in said recess and said opening in position to hold said post and said head from turning relative to each other, and
(g) means for holding said pin in said position in said recess and opening,
(h) said last-mentioned means including a split annular member mounted in said groove in axially overlying relation to said pin.

3. A piston as defined in claim 2, and in which
(a) said means for holding said pin includes a resilient plug disposed in said opening between said pin and said annular member.

4. In a driver assembly including an elongated cylinder
(a) a piston head slidably mounted in said cylinder for reciprocation longitudinally thereof,
(b) said piston head having
   (1) internal threads,
   (2) a radially extending opening, and
   (3) an annular groove extending around the periphery of said head and disposed radially outwardly of said opening in direct communication therewith,
(c) an elongated post having
   (1) threads on the outer periphery thereof operatively engaged with said internal threads in position to releasably secure said head and said post together, and
   (2) a recess in the outer periphery thereof,
(d) a pin removably mounted in said opening and in said recess in position to hold said head and said post from turning relative to each other,
(e) a resilient plug mounted in said opening outwardly of said pin in abutting engagement with the adjacent end of said pin, and
(f) a split piston ring mounted in said groove in such position that the outer periphery of said ring is engaged with the inner surface of said cylinder, and the inner periphery of said ring is engaged with said plug to thereby hold said pin is said position in said opening and in said recess.

5. A piston comprising
(a) an elongated, substantially cylindrical-shaped post,
(b) said post having a plurality of elongated recesses in the outer periphery thereof
   (1) laterally spaced from each other around the periphery of said post, and
   (2) opening outwardly through one end of said post,
(c) said post having threads on the outer periphery thereof on the side of said recesses remote from said one end,
(d) a piston head having
   (1) threads operatively engaged with said first-mentioned threads in position to releasably secure said post and said head together,
   (2) a plurality of spaced, radially extending openings therethrough, and
   (3) an annular groove in the outer periphery thereof disposed radially outwardly of said openings in direct communication therewith,
(e) said piston head being disposed in such position on said post that one of said openings is disposed in axially aligned direct communication with one of said recesses,
(f) a steel pin slidably mounted in said one opening and in said one recess in position to hold said post and said head against rotation relative to each other,
(g) and means for releasably, yieldingly holding said pin in said position,
(h) said means comprising
   (1) a resilient nylon plug mounted in said one opening outwardly of said pin and in abutting engagement with the latter, and
   (2) a split piston ring mounted in said groove outwardly of said plug and in abutting engagement with the latter.

6. A piston comprising
(a) an elongated member having
   (1) threads on one end portion thereof, and
   (2) a plurality of openings spaced from each other around the periphery of said member,
(b) a piston head member having
   (1) threads therein operatively engaged with said threads on said elongated member for releasably securing said piston head member to said elongated member, and
   (2) a plurality of openings therethrough spaced from each other around the periphery of said piston head member,
(c) an abutment member mounted in one of said first mentioned and second mentioned openings in position to hold said elongated member and said piston head member against rotation relative to each other, and
(d) means, including a split bushing mounted in said piston head member in overlying relation to said abutment member, for holding said abutment member in said position in said openings.

7. A piston as defined in claim 6, and in which
(a) one of said two first mentioned members has an even number of said openings therein, and
(b) the other one of said two first mentioned members has an odd number of said openings therein.

References Cited by the Examiner

UNITED STATES PATENTS

| | | | |
|---|---|---|---|
| 661,558 | 11/1900 | Shuff | 287—53 |
| 1,362,435 | 12/1920 | Neraas | 92—251 X |
| 2,188,957 | 2/1940 | Pfauser | 92—252 X |
| 2,360,568 | 10/1944 | McAllister | 92—220 X |
| 2,413,347 | 12/1946 | Hamilton et al. | 92—256 |

SAMUEL LEVINE, *Primary Examiner.*

A. S. ROSEN, *Assistant Examiner.*